March 29, 1960  C. S. LAUTENBACH ET AL  2,930,651
CONVERTIBLE TOP LINKAGE AND ACTUATING MEANS
Filed May 13, 1959  3 Sheets-Sheet 2

INVENTORS
Charles S. Lautenbach, &
BY Samuel C. Pollock

Herbert Furman
ATTORNEY

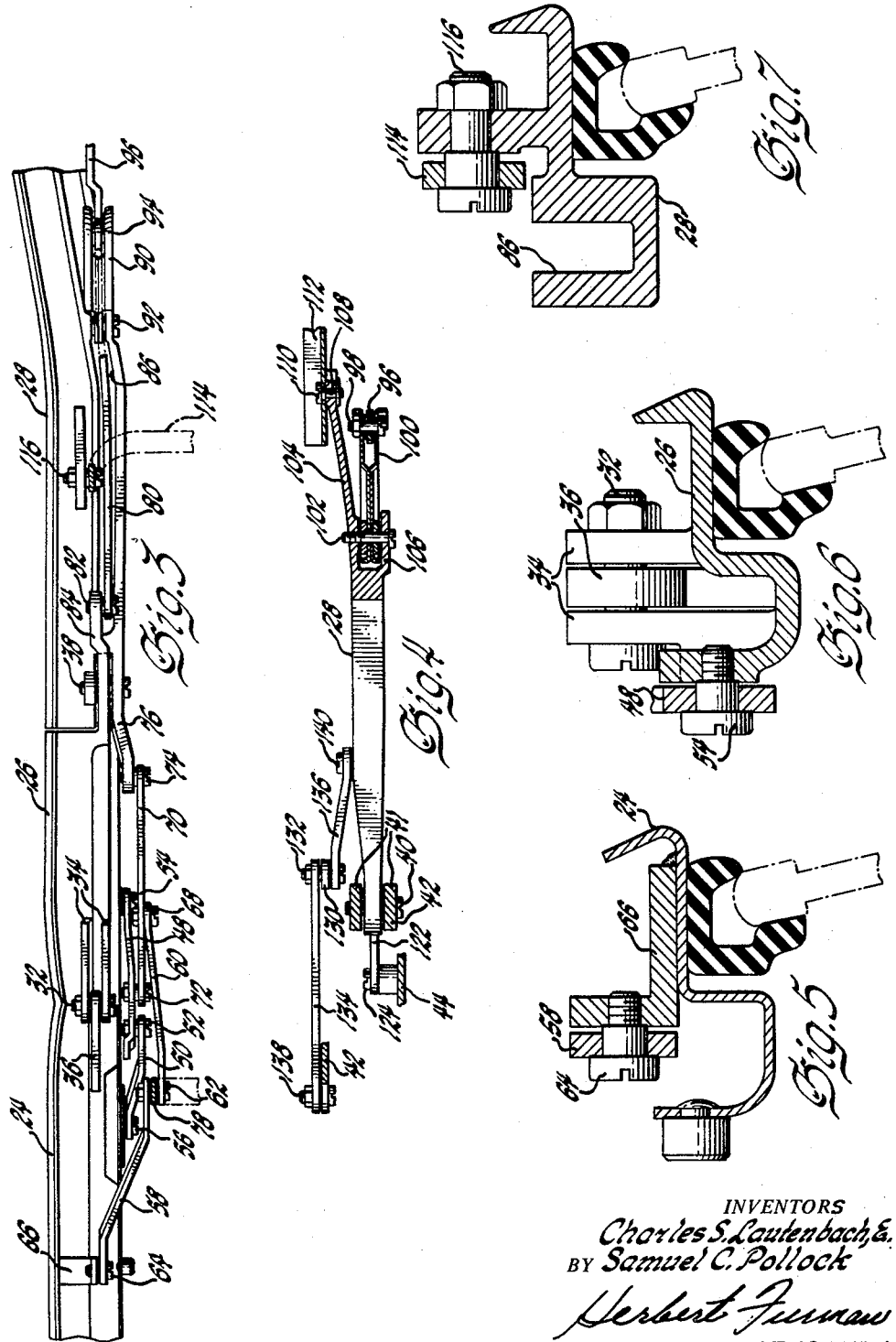

United States Patent Office 2,930,651
Patented Mar. 29, 1960

2,930,651

CONVERTIBLE TOP LINKAGE AND ACTUATING MEANS

Charles S. Lautenbach and Samuel C. Pollock, Rochester, Mich., assignors to General Motors Corporation, Detroit, Mich., a corporation of Delaware Application May 13, 1959, Serial No. 813,012

4 Claims. (Cl. 296—117)

This invention relates to convertible tops and more particularly to convertible top linkages and actuating means.

The convertible top and actuating means of this invention is particularly intended for use with power actuated convertible tops. In many present tops of this type, difficulties are often encountered in the raising and lowering of the top because of the large force output required of the power actuator. During movement of the top, the required output may exceed the rated force output of the actuator and result in an uneven and halting movement of the top out of the top well and unfolding movement of the top in spurts rather than in a smooth and continuous manner.

In copending application S.N. 509,843, Lelli et al., filed May 20, 1955, now Patent No. 2,897,003, there is disclosed a convertible top linkage and actuating means which imparts a variable restraint on the action of the power arm or power link of the top so that folding and unfolding of the top takes place at a controlled lower rate and the power actuator operates within its effective range of force output at all times.

The convertible top linkage and actuating means of this invention is an improvement over that disclosed in the aforementioned copending application. In the structure disclosed in the application, the power arm or power link is operatively connected between the intermediate rail section and a bell crank and linkage arrangement, with the power actuator being connected to the rear rail section of the top frame. An arrangement such as this works well in most convertible bodies but has certain disadvantages when used with convertible bodies wherein the rear quarter window opening is rather large whereby it is difficult for the power arm to be connected to the intermediate rail section and to extend between the body and this rail section around the rather large rear quarter window opening.

This invention provides an improved top linkage and actuating means which is particularly adapted for use with convertible bodies having rather large rear quarter window openings and which retains all of the advantages of the linkage and actuating means disclosed in the aforementioned application while eliminating the disadvantages thereof so as to smoothly and easily transfer power from the power actuator to the intermediate rail section.

The primary object of this invention is to provide an improved convertible top linkage and actuating means therefor. Another object of this invention is to provide an improved convertible top linkage and actuating means for transferring power from a power actuator to an intermediate rail section. A further object of this invention is to provide an improved convertible top linkage and actuating means providing an improved power train between a power actuator and the intermediate rail section of the top frame in convertible vehicle bodies having a large rear quarter window opening.

These and other objects of this invention will be more readily apparent from the following specification and drawings, wherein:

Figure 3 is a view taken along along the plane indicated generally by line 3—3 of Figure 1;

Figure 4 is a view taken generally along the plane indicated by line 4—4 of Figure 1;

Figure 5 is an enlarged sectional view taken along the plane indicated generally by line 5—5 of Figure 1;

Figure 6 is an enlarged sectional view taken generally along the plane indicated by line 6—6 of Figure 1; and Figure 7 is an enlarged sectional view taken generally along the plane indicated by line 7—7 of Figure 1.

Figure 1:
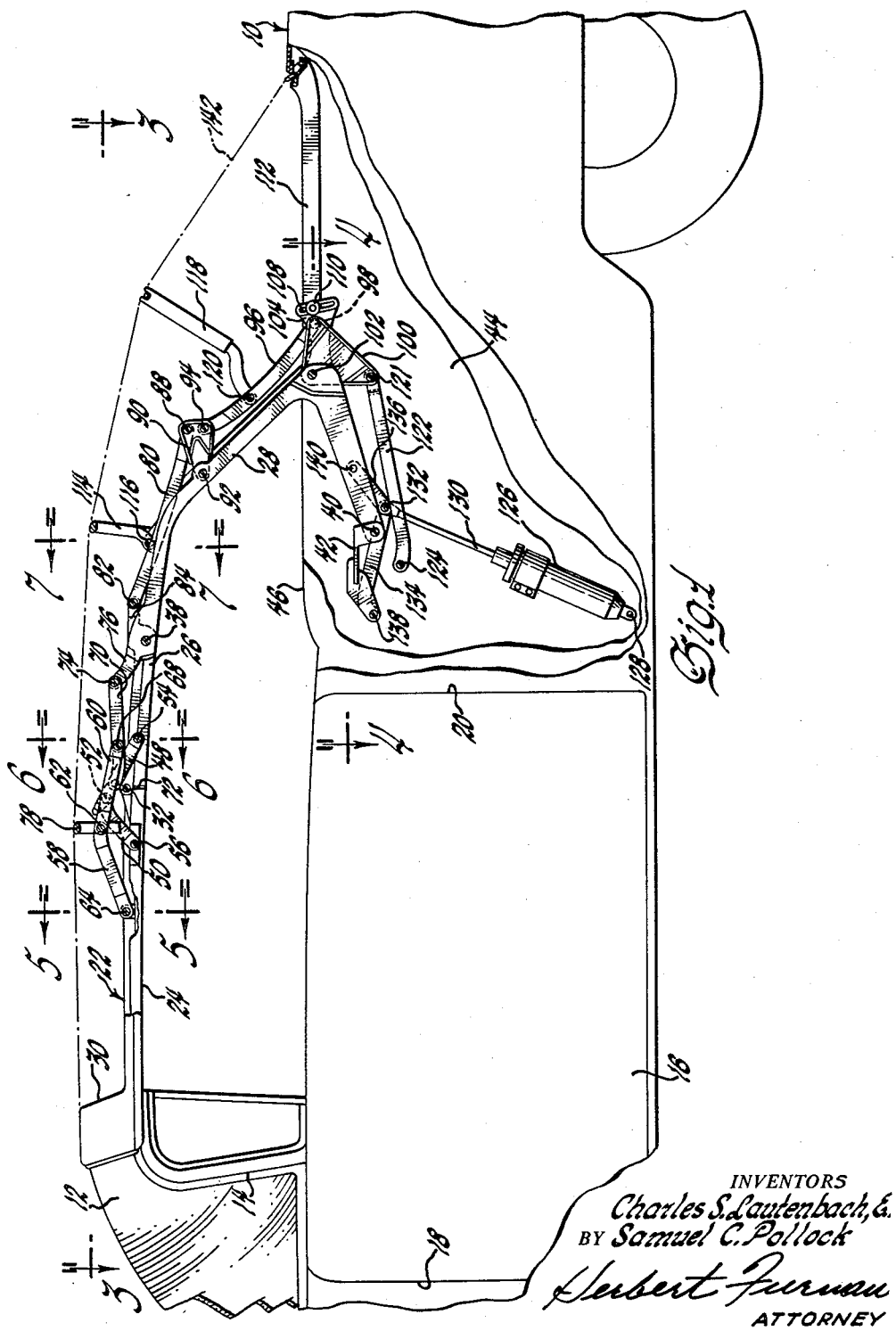
Figure 1 is a partial side elevational view of a convertible vehicle body having a convertible top mounted thereon embodying a top linkage and actuating means according to this invention, with parts thereof broken away for clarity of illustration.
Figure 2:
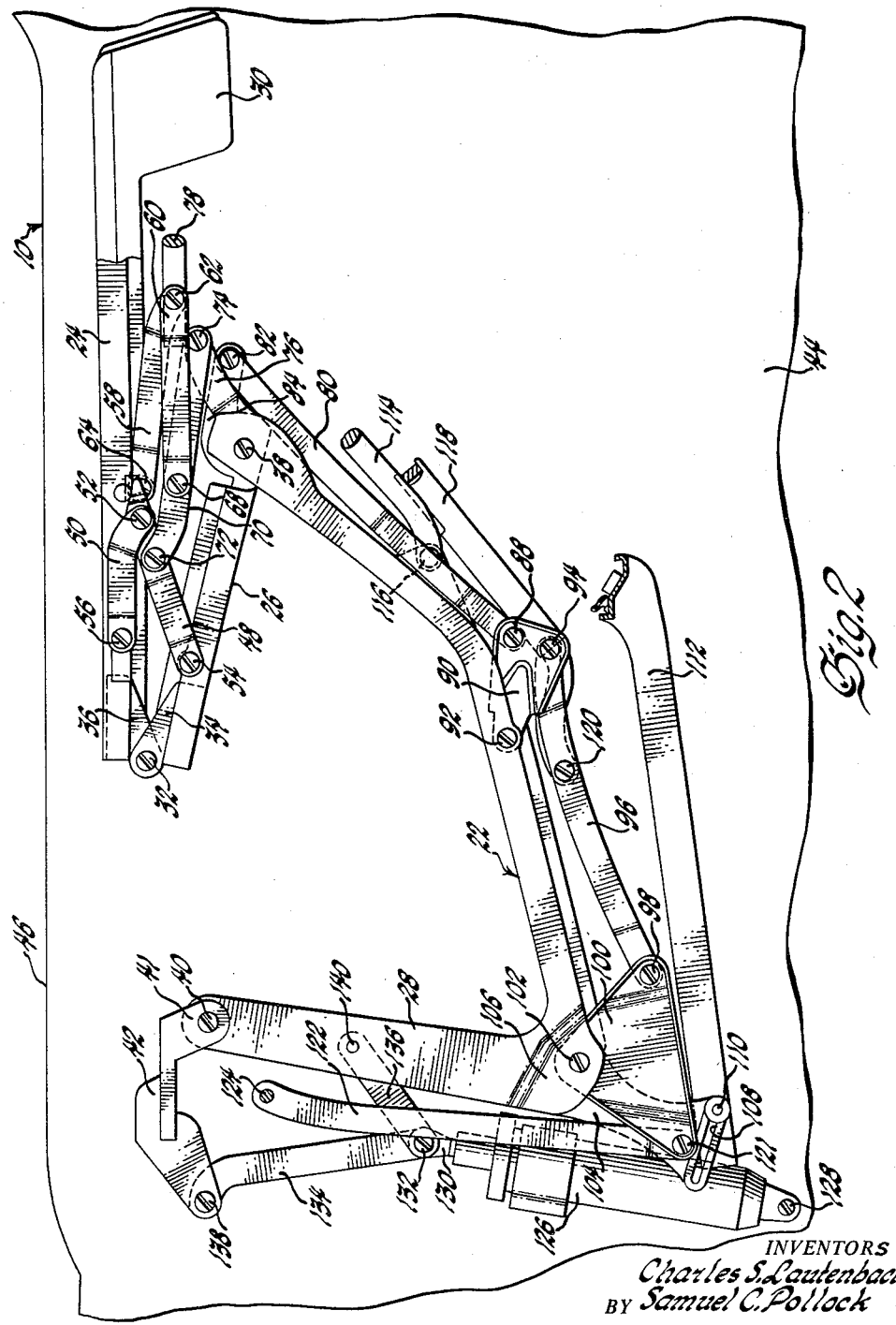
Figure 2 is a side elevational view of the convertible top in the lowered position thereof within the body.

Referring now to the drawings, a convertible vehicle body 10 includes a windshield 12, a windshield header 14, and a front door 16 at either side of the body hinged thereto at its forward edge 18 and latched thereto at its rearward edge 20. A convertible top frame 22 embodying a top linkage and actuating means according to this invention is mounted on body 10 for movement between a raised position as shown in Figure 1 and a lowered position as shown in Figure 2. Since each side of the top frame is of like construction, although of different hand, only one side will be particularly described.

The top frame 22 generally comprises front, intermediate and rear rail sections 24, 26 and 28, respectively. The front rail section 24 is integral with the top header 30 which seats on the windshield frame 14 in the raised position of the top frame and may be secured thereto by suitable top header latches, not shown. Rail section 24 is pivoted to rail section 26 at 32 by a pair of upstanding ears 34 on rail section 26, Figure 6, which receive and are bolted to an upstanding ear 36 on rail section 24. Rail sections 26 and 28 are pivoted together at 38, and rail section 28 is pivoted at 40 between ears 41, Figure 4, of a bracket 42 which is fixedly mounted on the rear quarter inner body panel 44 to thereby pivotally mount the top frame on the body.

As can be seen in Figure 1, the rear rail section 28 forms substantially the entire upper edge of the rear quarter window opening, with the belt line 46 of the body defining the lower edge of the window opening. The forward edge of the window opening lies generally in a vertical plane through the rearward edge 20 of door 16, and the rear quarter window, not shown, seals against the vertically movable door window, not shown, in the closed position of each of these windows.

The control means interconnecting rail sections 24 and 26 generally comprise a pair of toggle links 48 and 50 pivoted together at 52, with link 48 being pivoted at 54 to rail section 26 and link 50 being pivoted at 56 to rail section 24. Another set of toggle links 58 and 60 are pivoted together at 62, with link 58 being pivoted at 64 to an angle bracket 66 secured to rail section 24, Figure 5, and link 60 being pivoted at 68 to an intermediate portion of a control link 70. The forward end of link 70 is pivoted at 72 to an intermediate portion of link 48 and the rearward end thereof is pivoted at 74 to an extension 76, Figure 3, of the rear rail section 28 which extends beyond the pivot 38 between rail sections 26 and 28. The pivot 62 of links 58 and 60 further supports the forward or No. 1 bow 78 of the top frame.

The control means interconnecting rail sections 26 and 28 includes a control link 80 having the forward end thereof pivoted at 82 to an extension 84 of rail section 26. As can be seen in Figure 3 of the drawings, this link is movable into and out of a slot 86 provided in rail section 28. The rearward end of link 80 is pivoted at 88 to a bell crank 90 pivoted at 92 on rail section 28 between integral ears thereof. As shown in Figure 3 of the drawings the bell crank 90 generally comprises a pair of back to back stamped metal plates which are secured together in a suitable manner prior to being mounted on the rear rail section. The bell crank 90 is pivoted at 94 to the upper end of a power arm or power link 96, the lower end of which is pivoted at 98 to another bell crank 100 of the same construction as bell crank 90. Bell crank 100 is pivoted at 102 to rail section 28 between inboard and outboard integral ears 104 and 106 thereof, respectively. The inboard ear 104 includes a closed slot 108 which slidably and pivotally receives a pin 110 fixed to the deck bow 112 in order to slidably and pivotally mount the deck bow on the top frame. The top frame further supports an intermediate or No. 2 bow 114 pivoted to rail section 28 at 116 and a rear or No. 3 bow 118 pivoted to the power arm 96 at 120.

As best shown in Figure 1 of the drawings, bell crank 100 is pivoted at 121 to one end of a link 122, the other end of which is pivoted to body panel 44 at 124. A power actuator 126 of the piston and cylinder type is pivoted to panel 44 at 128 and the piston rod 130 thereof is pivoted at 132 to the joint of a pair of toggle links 134 and 136. Link 134 is pivoted to bracket 42 at 138 and link 136 is pivoted to rail section 28 at 140.

The top frame 22 is shown in raised position in Figure 1 of the drawings and in lowered position in Figure 2 of the drawings wherein the top frame is located within the body 10 in the usual convertible top well located rearwardly of the rear seat of the body. If the top frame is to be moved from its raised to its lowered position, power actuator 126 is supplied with hydraulic pressure fluid in order to retract the piston rod 130 thereof. This will fold links 134 and 136 so as to swing the rear rail section 28 clockwise or downwardly and rearwardly of the body about its pivot 40. As rail section 28 swings in this direction, bell crank 100 will bodily move with the rail section and will also be urged to swing in the opposite direction, or counterclockwise as viewed in Figure 1, about its pivot 102 on the rear rail section since link 122 swings about the pivot 124 thereof in a different arc greater than the arc of movement of pivot 102 about the pivot 40 of the rail section 28 on the body. This will cause the power arm 96 to be placed in compression and to urge bell crank 90 to swing in the same direction as bell crank 100, or counterclockwise, about the pivot 92 thereof on rail section 28 as the bell crank 90 bodily moves with the rail section. Movement of the bell crank 90 in this direction will also place the control link 80 in compression so as to urge rail sections 26 and 24 to swing downwardly, or counterclockwise as viewed in Figure 1, as a unit about the pivot 38 of rail section 26 to rail section 28.

Since the link 122 swings in an arc, the counterclockwise movement of the bell cranks 100 and 90 is continuously variable. Thus, the compression which is placed in the power arm 96 and in the control link 80 is also continuously variable and a variable restraint is placed on the action of the power arm and control link so as to delay folding movement of the top frame as it is lowered and thereby allow the power actuator 126 to operate within its effective range of power output. It will be noted that link 122 must swing in an arc which is not concentric with the arc of movement of the pivot 102 in order that the power arm 96 and the control link 80 be placed in compression as the top frame is lowered.

As the rail sections 24 and 26 are urged by link 80 to swing counterclockwise as a unit about the pivot 38, the control link 70 which interconnects rail section 28 and toggle linkages 48, 50, and 58, 60, will fold these linkages so as to swing rail section 24 rearward or clockwise relative to rail section 26 about the pivot 32 therebetween as the rail sections 24 and 26 swing about the pivot 38 to hold rail sections 24 and 26 relative to each other and rail section 28 as the top is lowered.

The movement of the top bows is controlled by the top fabric 142, indicated schematically in Figure 1 which interconnects the bows 78, 114, 118 and 112 and the top header 30. As the rail section 24 swings rearwardly over the rail section 26, the slack in the top fabric will allow bows 78, 114 and 118 to swing rearwardly or clockwise about their respective pivots on the top frame and allow bow 112 to both shift downwardly within slot 108 and swing rearwardly or clockwise relative to rail section 28 whereby the bows are disposed as shown in Figure 2 of the drawings when the top is in a lowered position.

The function of the bell cranks 90 and 100 and link 122 is to place a continuously variable restraint on the power arm 96 and control link 80 during lowering movement of the top frame so as to thereby control the rate at which rail section 26 folds relative to rail section 28 and likewise the rate at which rail section 24 folds relative to the rail section 26 by means of the control link 70 and associated toggle linkages therewith.

When the top frame 22 is being moved from its lowered position within the body, as shown in Figure 2, to its raised position, as shown in Figure 1, the bell cranks 90 and 100 and link 122 again function to place a variable restraint upon the action of the power arm 96 and control link 80 to control the rate at which the rail section 26 unfolds relative to rail section 28 and likewise the rate at which rail section 24 unfolds relative to rail section 26 by means of the control link 70 and associated toggle linkages therewith. It is believed that the action of the various control links, toggle linkages, and bell cranks during raising movement of the top frame can easily be understood without further specific description. However, it should be noted that the power arm 96 and control link 80 are placed in tension rather than in compression when the top is being raised, with this tension being continuously variable as link 122 swings in its arc about the pivot 124 thereof on the body at the same time as the rear rail section 28 swings in a similar arc about the pivot 40 thereof on the body. Since the tension placed in the power arm and control link are continuously variable a variable restraint is thus placed upon the action of the power arm and control link.

It should also be noted that few difficulties are usually encountered in lowering movement of the top frame despite the fact that the power actuator has to supply power both to lower and to fold the top frame. However, frequent difficulties are encountered when the top frame is moved to a raised position since the top frame starts to unfold as it is being moved out of the body rather than this movement being delayed until the top frame has been moved to a position wherein less force is required to raise the top frame and thus a greater portion of the force output of the power actuator is available to unfold the top frame. This condition is also aggravated by the lower slack height of many modern convertible tops whereby the top is stored well within the top well, as shown in Figure 2, in the lowered position thereof. Thus the top linkage and actuating means of this invention provides a more distinct advantage during raising movement of the top frame than during lowering movement thereof, although the advantage is noticeable during both cycles of movement.

The variable restraint placed upon the action of the top frame by the bell cranks 90 and 100 and link 122 controls the rate of both folding and unfolding movement of the top frame and thereby controls the force output required of the power actuator 126 whereby this required force output is always within the range of the actuator so that the top both folds and unfolds in a smooth and continuous manner without any spurting or jerking or uneven movement thereof.

Thus this invention provides a new and improved convertible top linkage and actuating means.

What is claimed is:

1. In a convertible vehicle body, the combination comprising, a foldable top frame including a pair of pivotally connected rail sections, means swingably mounting one of said rail sections on said body to mount said top frame thereon for movement between raised and lowered positions, operating means for so moving said top frame, spaced lever means pivoted on said one rail section at points spaced radially from the pivot of said one rail section on said body for swinging movement of said lever means with said rail section and swinging movement thereon, power arm means interconnecting said lever means for simultaneous swinging movement thereof, control means operatively interconnecting one of said lever means and the other rail section, link means swingably mounted on said body at a point spaced radially from the pivot of said one rail section on said body for swinging movement in the same direction as said one rail section and in a different arc than both said lever means, and means pivotally connecting said link means to the other lever means to control swinging movement of said other lever means about its pivot on said one rail section upon swinging movement of one rail section about the pivot thereof on said body, the several pivots of said other lever means and link means and the length of said link means being arranged such that said link means biases said other lever means in an opposite directions about the pivot thereof on said one rail section than the direction of swinging movement of said one rail section to thereby place a variable restraint upon the action of said power arm means and causes said power arm means to bias said one lever means in the same direction as said other lever means to thereby place a variable restraint upon the action of said control means.

2. In a convertible vehicle body, the combination comprising, a foldable top frame including pivotally connected rear and forward rail sections, means swingably mounting said rear rail section on said body to mount said top frame thereon for movement between raised and lowered positions, operating means for so moving said top frame, spaced lever means pivoted on said rear rail section at points spaced radially above the pivot of said rear rail section on said body for swinging movement of said lever means with said rail section and swinging movement thereon, power arm means pivotally interconnecting said lever means for simultaneous swinging movement thereof, a control member operatively interconnecting one of said lever means and said forward rail section, link means swingably mounted on said body at a point spaced radially below the pivot of said rear rail section on said body for swinging movement in the same direction as said rear rail section and in a different arc than either said lever means, means pivotally connecting said link means to the other of said lever means to control simultaneous swinging movement of said lever means about the pivots thereof on said rear rail section upon swinging movement of said rear rail section about the pivot thereof on said body, the several pivots of said other lever means and link means and the length of said link means being arranged such that said link means biases said other lever means in an opposite direction about the pivot thereof on said rear rail section than the direction of swinging movement of said rear rail section to thereby place a variable restraint upon the action of said power arm means and cause said power arm means to bias said one lever means in the same direction as said other lever means to thereby place a variable restraint upon the action of said control member.

3. In a convertible vehicle body, the combination comprising, a foldable top frame including pivotally connected forward and rear rail sections, said rear rail section including an upper portion defining substantially the entire upper edge of a window opening and a lower lateral extension portion located below the lower edge of said window opening, means swingably mounting said extension on said body to mount said top thereon for movement between raised and lowered positions, operating means for so moving said top frame, a pair of spaced lever means pivoted on said rear rail section at points spaced radially from the pivot of said rear rail section on said body for swinging movement of said lever means with said rail section and swinging movement thereon, one of said lever means being pivoted on said upper portion of said rear rail section and the other of said lever means being pivoted substantially at the juncture of said upper and lower portions, power arm means pivotally interconnecting said lever means for simultaneous swinging movement thereof, a control link member operatively interconnecting one of said lever means and said forward rail section, link means swingably mounted on said body at a point spaced radially from the pivot of said extension on said body for swinging movement in the same direction as said rear rail section and in a different arc than either said lever means, and means pivotally connecting said link means to said other lever means to control swinging movement of said other lever means about its pivot on said rear rail section upon swinging movement of said rail section and other lever means about the pivot of said rail section on said body, the several pivots of said other lever means and link means and the length of said link means being arranged such that said link means biases said other lever means in an opposite direction about the pivot thereof on said rear rail section than the direction of swinging movement of said rear rail section to thereby place a variable restraint upon the action of said power arm means and causes said power arm means to bias said one lever means in the same direction as said other lever means to thereby place a variable restraint on the action of said control link member.

4. In a convertible vehicle body, the combination comprising, a foldable top frame including pivotally connected forward and rear rail sections, said rear rail section including an upper portion defining substantially the entire upper edge of a window opening and a lower lateral extension portion located below the lower edge of said window opening, means swingably mounting said extension on said body to mount said top thereon for movement between raised and lowered positions, operating means for so moving said top frame, a pair of spaced bell crank levers pivoted on said rear rail section at points spaced radially from the pivot of said rear rail section on said body for swinging movement of said levers with said rail section and swinging movement thereon, one of said levers being pivoted on said upper portion of said rear rail section and the other of said levers being pivoted substantially at the juncture of said upper and lower extension portions, a power arm pivotally interconnecting said levers for simultaneous swinging movement thereof, a control link member operatively interconnecting said upper lever and said forward rail section, a link swingably mounted on said body at a point spaced radially below the pivot of said extension on said body for swinging movement in the same direction as said rear rail section and in a different arc than either said levers, and means pivotally connecting said link to said lower lever to control swinging movement of said lower lever means about its pivot on said rear rail section upon swinging movement of said rail section and lower lever about the pivot of said rail section on said body, the several pivots of said lower lever and link and the length of said link being arranged such that said link biases said lower lever in an opposite direction about the pivot thereof on said rear rail section than the direction of swinging movement of said rear rail section to thereby place a variable restraint upon the action of said power arm and causes said power arm to bias said upper lever in the same direction as said lower lever to thereby place a variable restraint on the action of said control link member.

References Cited in the file of this patent

UNITED STATES PATENTS

| | | |
|---|---|---|
| 2,323,547 | Levon | July 6, 1943 |
| 2,897,003 | Lelli | July 28, 1959 |